INVENTORS.
MORTON F. PHELPS,
WILLIAM D. PHELPS, JR.

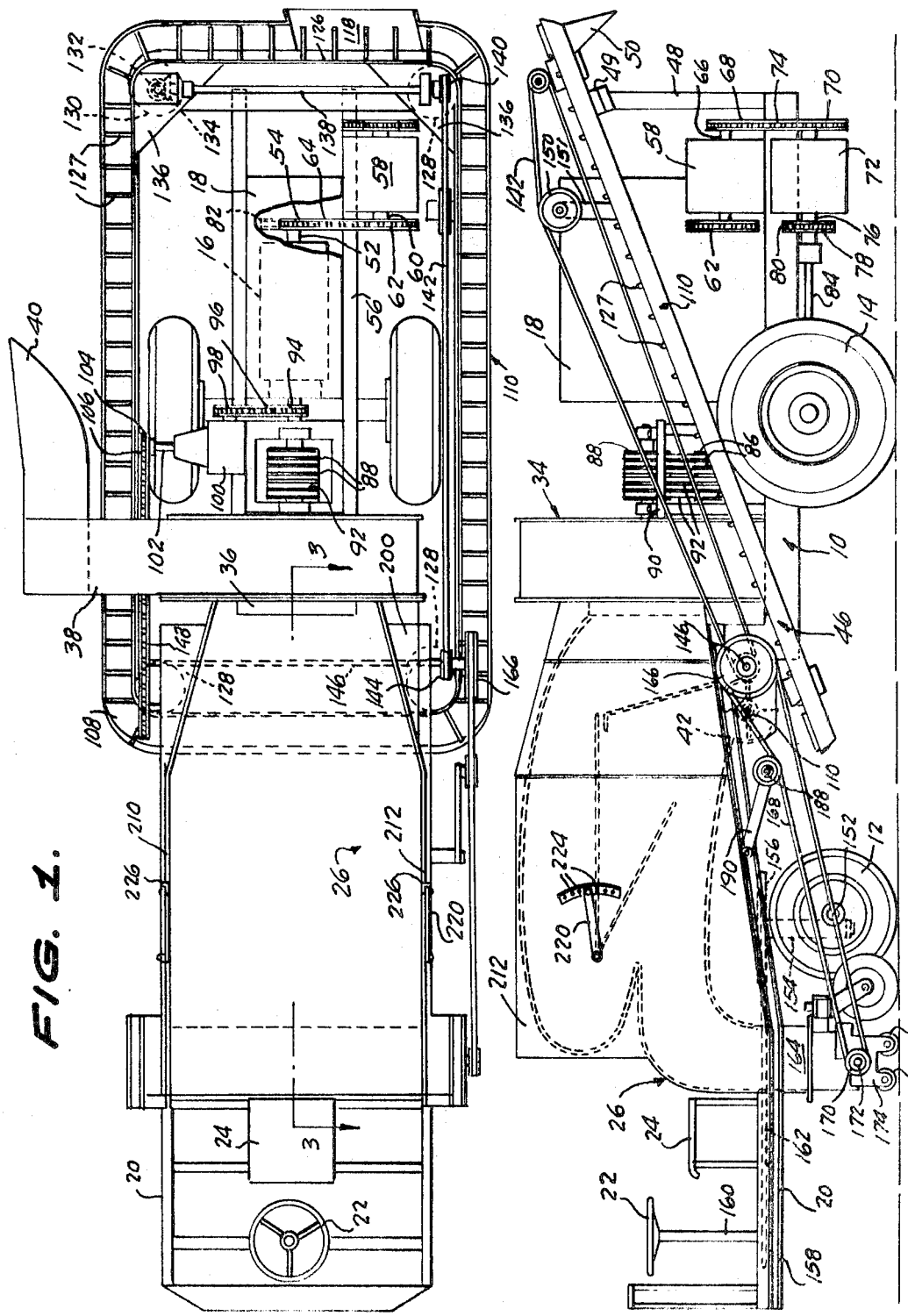

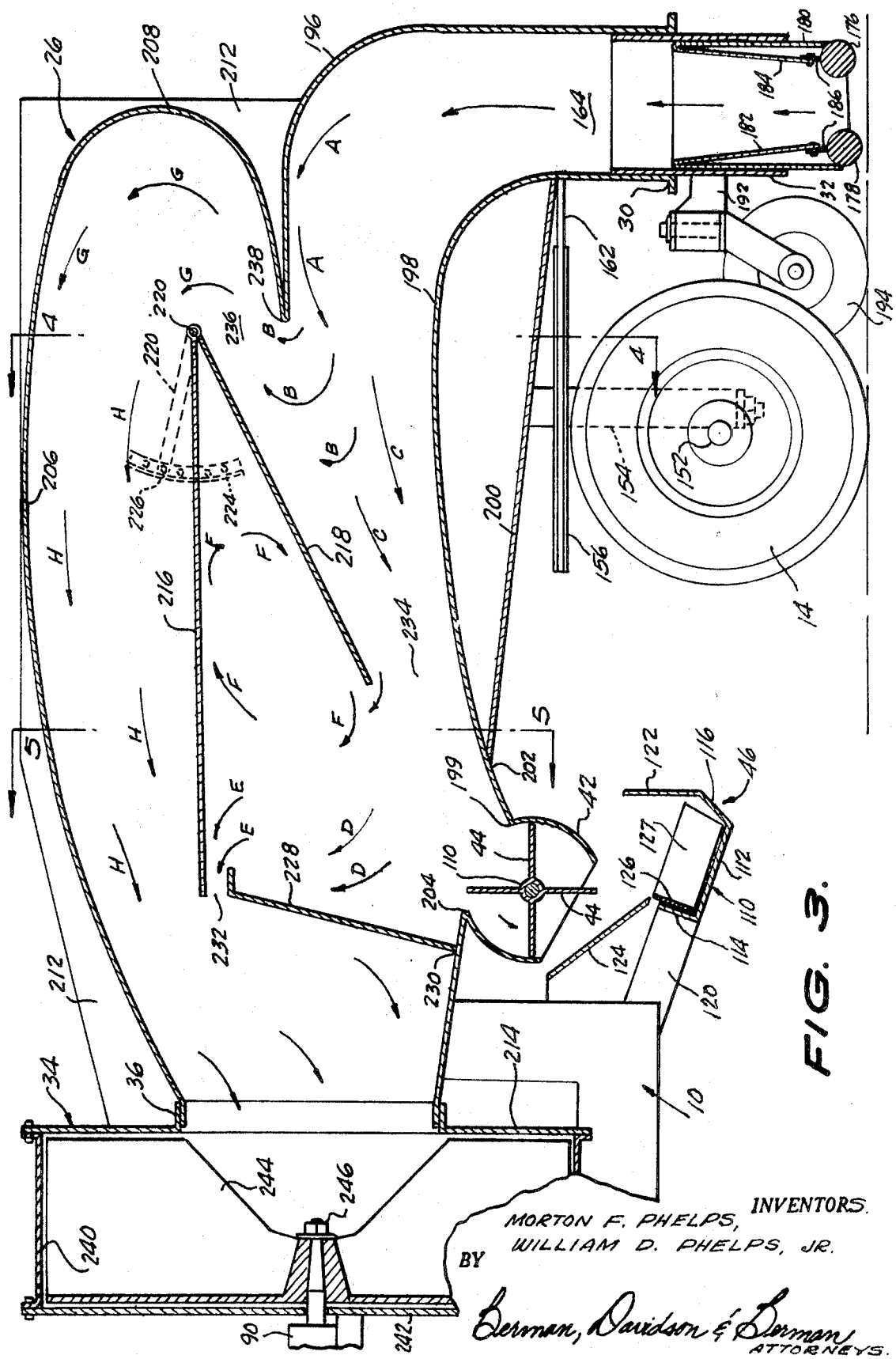

3,611,688
NUT HARVESTING MACHINE
Morton F. Phelps, Little Rock, Ark., and William D. Phelps, Jr., 9417 New Benton Highway, Little Rock, Ark. 72204; Morton E. Phelps and William D. Phelps executors of said Morton F. Phelps, deceased
Filed Sept. 13, 1968, Ser. No. 759,717
Int. Cl. A01g 19/00
U.S. Cl. 56—328                                                    10 Claims

ABSTRACT OF THE DISCLOSURE

A self-propelled nut harvesting machine, for picking up nuts along with unwanted trash from the ground and separating the nuts from the trash, including a wheeled chassis with a power source, a nut receiving nozzle, a trash separating chamber communicating at one end with the nozzle and at the other end with suction means, a trash discharge outlet on the suction means, and an air lock connected to the separating chamber for receiving and discharging clean nuts. The separating chamber includes means for moving the entering stream of air containing nuts and trash vertically from the nozzle, means for turning said stream to move horizontally toward the suction means, a baffle for reversing a portion of the stream at increased velocity to flow oppositely and upwardly and thereby separate and carry the trash away from the nuts, and duct means for again reversing said portion of the stream carrying trash to flow toward said suction means.

---

This invention relates to a self-propelled machine for suction gathering nuts along with unwanted trash from the ground, to which they have fallen or have been shaken, said machine including a separation chamber arranged to divert a portion of the suction stream to efficiently separate the trash from the nuts, the trash being deposited from one discharge outlet and the nuts from another.

Machines of the general type of the present invention are conventionally available, but these machines are subject to a number of defects and disadvantages, as for example, they do not operate efficiently to separate trash from the gathered nuts; they employ complicated apparatus for the separation process; they are slower to perform the harvesting operation; and they require more man-power to operate and maintain.

It is a primary object of the present invention to provide an improved nut harvesting machine which will obviate the above briefly outlined disadvantages of conventional machines.

It is an important object of the invention to provide an improved machine which employs a suction airstream to pick up nuts and trash from the ground, and which separates the nuts from the trash by opposing the momentum of the nuts to the velocity and direction of the suction airstream.

Another object of the invention is to provide an improved nut harvesting machine, having the above described characteristics, wherein the separation of the trash from the nuts is accomplished by diverting a portion of the suction airstream and increasing its velocity, the diverted airstream carrying the trash along a different path from the nuts which follow normal gravity modified trajectories for relatively heavy bodies initially propelled along elevated horizontal paths.

Still another object of the invention is to provide an improved nut harvesting machine, having the above described characteristics, wherein a pick-up nozzle is provided borne on small long rollers, which provide a balanced suction in said nozzle even on unlevel ground, the long rollers tending to prevent lifting of sticks and larger pieces of trash into the machine along with the nuts.

A further object of the invention is to provide an improved nut harvesting machine, having the above described characteristics, which is of simple construction, easy to operate by one man, and which is simple and relatively inexpensive to fabricate and use.

A still further object of the invention is to provide an improved nut harvesting machine, having the above described characteristics, which operates rapidly and efficiently to yield a maximum harvest in the shortest possible time with a minimum amount of manual labor, and which delivers the nuts in an efficiently clean condition by reason of subjection to a sweeping action by the suction air stream engendered by a plurality of changes in direction and velocity during the trash separation process.

The novel features that are considered characteristic of the invention are set forth with particularity in the appended claims. The invention, itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a plan view of an improved nut harvesting machine according to the invention;

FIG. 2 is a side elevation of the machine shown in FIG. 1;

Figure 4:
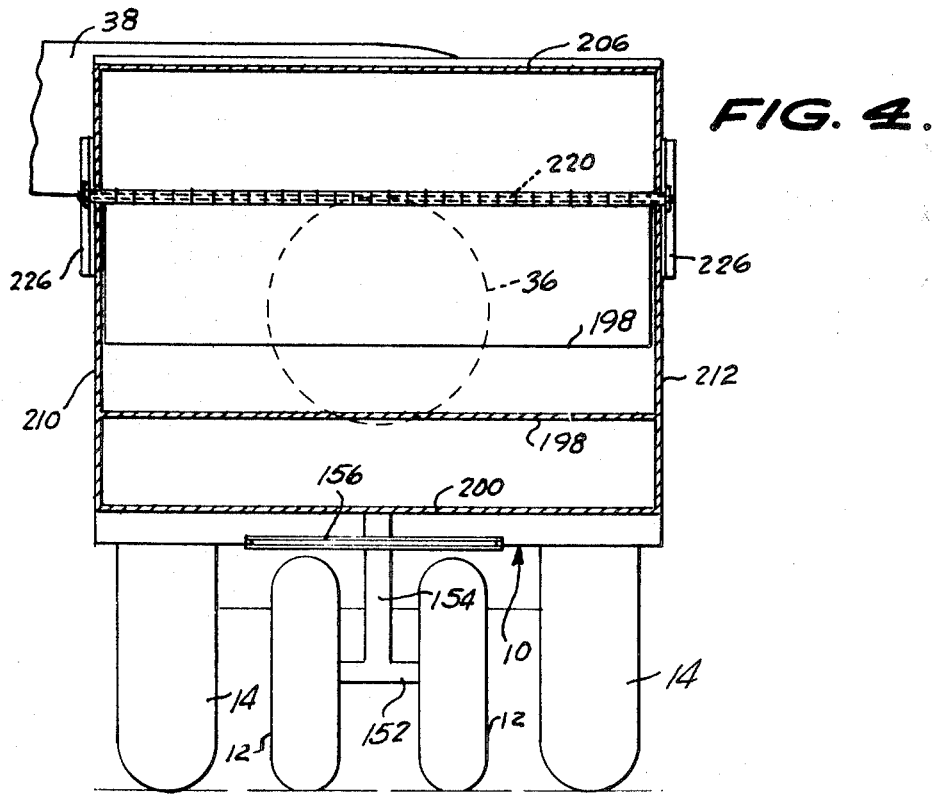
Figure 5:
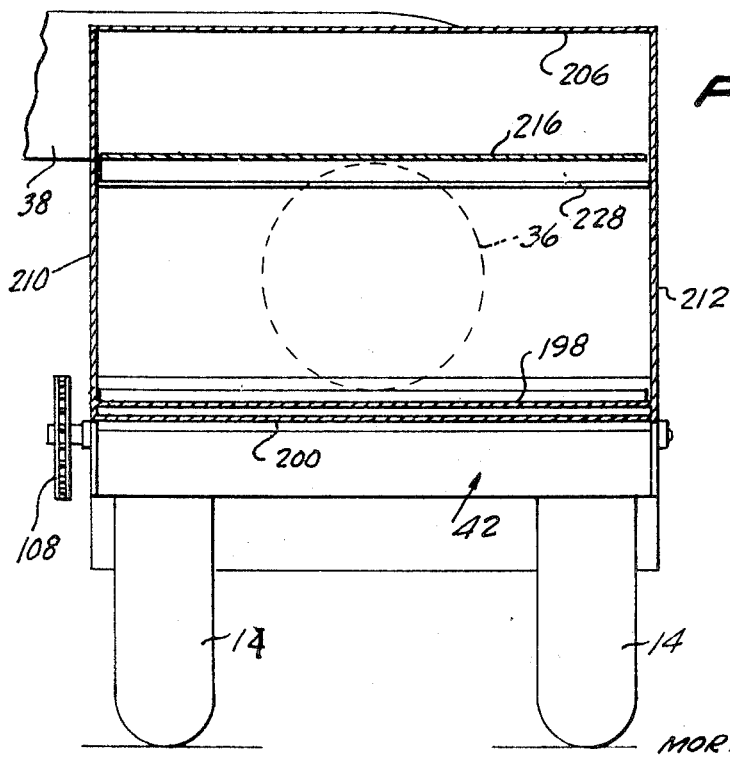

FIG. 3 is an enlarged sectional view taken along the line 3—3 of FIG. 1, and looking in the direction of the arrows; and FIGS. 4 and 5 are transverse sectional views taken along lines 4—4 and 5—5 of FIG. 3.

Referring now more particularly to the drawings, the improved machine according to this invention comprises a chassis 10 having front supporting wheels 12 and rear drive wheels 14 powered by an engine 16, which may be conventional and encased in a housing 18. A suitable engine has been found to be the "Ford 300," manufactured by the Ford Motor Company. The chassis carries a front platform 20 with steering wheel 22 and an operator's seat 24. Immediately to the rear of the seat is the forward end of a separation chamber 26, to be later described, the chamber having a special shape for purposes to be disclosed. At the front of the separation chamber is an inlet 30 carrying a telescoping nozzle 32, and at its rear is a cyclone-type fan 34 having an inlet 36 opening to the separation chamber and an outlet duct 38 terminating in a nozzle 40 for discharging trash removed from the gathered nuts to one side of the vehicle. In its bottom the separation chamber has an air lock 42 including rotating blades 44 which discharge the cleaned and separated nuts to a conveyor generally designated 46. The conveyor is continuous and extends upwardly toward the rear of the vehicle, where it is supported on standards 48 and crossbar 49, transversely across the rear of the vehicle, downwardly along the other side, and transversely under the air lock. Clean nuts carried by the conveyor are discharged through a chute 50 to a trailer vehicle, not shown.

The engine 16 includes a rearwardly extending drive shaft 52 having a sprocket 54 affixed thereto. At one side of the engine and carried by chassis frame members 56 in any suitable manner is a clutch mechanism 58 whose input shaft 60 is fixed to an input sprocket 62. Sprockets 54, 62 are connected by a chain 64. The output shaft 66 of the clutch also has a sprocket 68 which is connected to an input sprocket 70 of a transmission mechanism 72 by a chain 74. The transmission output shaft 76 carries a sprocket 78, which is connected by chain 80 extending transversely to the center of the vehicle and entrained over another sprocket 82, which may be twice the size of the transmission output sprocket and which is affixed to a second drive shaft 84 connected to a conventional differential, not visible in the drawings, to drive the rear wheels 14. The size and arrangement of the previously described parts are such that a rotational speed of 900 r.p.m. on the engine drive shaft 52 appears also on the output sprocket 68 of the clutch, and is reduced to 450 r.p.m. at the input sprocket 70 of the transmission, and being further reduced to 150 r.p.m. at the output sprocket 78 of the transmission. The speed at sprocket 82 is reduced to 75 r.p.m. which is also the speed of the drive shaft 84 while the differential drives the wheels 14 at approximately 18 r.p.m.

The forward end of the engine drive shaft 52 has affixed thereto a plurality of spaced wheels 86 having V-shaped grooves in their rims. These wheels are vertically aligned with similar wheels 88 affixed to the drive shaft 90 for the cyclone fan 34. The wheels 86, 88 are connected by belts 92 having V-shaped cross-sections, so that operation of the engine drives the cyclone fan at great speed, approximately 85% of the power of the engine being utilized for driving the fan.

Another sprocket 94 is fixed to the forward end of the engine drive shaft 52 between the engine and the belt wheels 86. This sprocket is connected by a belt, or chain 96 to the input sprocket 98 of a gear reduction mechanism 100. The output shaft 102 of this mechanism is connected through a sprocket 104 and chain 106 to a sprocket 108 fixed to a shaft 110 which carries the blades 44 of the air lock 42. Thus, operation of the engine 16 automatically rotates the blades of the air lock at a desired speed considerably less than the speed of the engine. The desired speed is obtained by selection of sprocket sizes and design of the gear speed reduction mechanism 100.

The conveyor 46 which receives nuts from the air lock comprises a rectangular, inclined chute 110 as previously described. The chute has a bottom wall 112, FIG. 3, and sidewalls 114, 116, but is open at the top. In the area 118, FIG. 1, at the upper rear of the vehicle the bottom wall is open to communicate with the discharge chute 50. The chute 110 is supported on the vehicle chassis and frame elements by suitable bracket arms 120 and front and rear baffles 122, 124 extend under the air lock to direct released nuts into the conveyor. The conveyor further comprises a continuous flexible belt 126, carrying spaced parallel substantially vertical plates 127 along its full length. The belt is movable along the inner wall 114 of the chute 110 about three free-running rollers 128 suitably supported in openings at the corners of the rectangular chute, and a similar fourth roller 130 in the remaining corner and which is driven by meshing bevel gears 132, 134. The corners of the conveyor chute are reinforced by gusset plates such as 136 which carry bearings for transverse shaft 138.

Bevel gear 134 is carried by shaft 138 having an input pulley 140 connected by a belt 142 to pulley 144 on a second shaft 146 parallel to the axle 110 which carries the blades of the air lock. Shaft 146 is driven from chain 106 by means of sprocket 148. The belt 142 is trained over a take-up roller 150 carried on a stub axle rotating in a bearing affixed to a support bracket arm 151 secured to the inner wall 114 of the chute 110. In this manner power from the engine is directed through the gear reduction mechanism 100, the chain 106, the axle 146, and the belt 142 to the shaft 138 to drive the conveyor belt 126 at a reduced speed. The short, spaced perpendicular plates 127 move with the belt about the periphery of the rectangle defined by the conveyor chute 110. Nuts fed into the lower transverse portion of the conveyor chute from the air lock 42 are moved along the bottom wall of the conveyor chute by the traveling plates 127 and are carried along the chute 110 to the upper rear portion of the vehicle where they fall through the opening 118 in the bottom wall of the chute into the discharge chute 50 and, from thence, pass into a trailer vehicle hitched to the back of the harvester. Any convenient and conventional form of trailer vehicle and hitch may be used. Once filled, the trailer may be replaced by an empty trailer to continue the harvesting.

The front wheels 14 of the vehicle are journaled at the ends of a transverse axle 152, FIGS. 2 and 5, affixed at its center to a vertical spindle 154 which is supported for rotation in a manner not shown, and has affixed thereto a large horizontal pulley 156. This pulley is connected to a smaller pulley 158 carried at the bottom of the steering wheel shaft 160 by an endless cable 162. To avoid the obstruction afforded by the downturned inlet duct portion 164 of the separation chamber 26, the cable 162 is carried outwardly around said portion 164 and inwardly to entrain pulley 156 by a number of additional pulleys, not shown.

The axle 146 carries a third pulley 166 connected by a belt 168 to a forward pulley 170 mounted on stub axle 172 for rotation in bearings in the upper part of the gear box 174. Within the gear box are a set of gears, not shown, which drive forward and rear rollers 176, 178 extending the width of the nozzle. These rollers are secured in bearing openings in a telescoped shoe 180, best seen in FIG. 3, one slightly higher than the other. The shoe has the upper ends of its forward and rear sides folded over and extended downwardly toward one another as at 182, 184 and their edges are tipped with rubber strips 186 bearing against the surfaces of the rollers. The belt 162 is tightened by means of an external roller 188 carried on the end of a pivoted arm 190 which may be adjusted and secured by any suitable means, not shown, to provide the appropriate tightness in the belt to drive the gears in the gear box 174 and thereby slowly rotate the rollers 176, 178 which ride slightly above the surface of the ground. The rollers 176 serve to maintain a floating, partial air seal at the foot of the shoe 180, to hold down large twigs and sticks and break them up into smaller pieces.

The shoe 180 is welded, or otherwise affixed, partially within the nozzle 32 which, in turn, is welded to arms 192 carrying a swiveling caster wheel 194. The flange at inlet 30 acts as a stop limiting upward movements of the wheel 194 and secured telescoping nozzle 32. Means are provided, but not shown, for guiding and limiting downward movements of the center wheel and nozzle 32 to follow ground surface irregularities.

Coming now to the separation chamber 26, it will be noted that its inlet duct portions 164, and telescoping nozzle 32 are of rectangular section extending the full width of the vehicle chassis. Inlet portion 164 is vertical, although it may take other inclinations, and is slightly larger in cross-section than the opening defined at the bottom of shoe 180 by the inwardly sloping sides 182, 184 and the rollers 176, 178. The forward outer wall of the duct portion 164 is curved rearwardly at 196 and a correspondingly curved inner baffle 198 extending the width of the chassis lead rearwardly in a gentle curve downwardly from the horizontal until it meets and is secured to the transverse edge 199 of an upper opening in the cylindrical wall of the air lock 42. The bottom wall 200 is flat, extends the full width of the chassis and is inclined upwardly and rearwardly from the front where it meets inlet duct portion 164 to the level of the bottom of the suction fan inlet 36 to which it is secured. A transverse opening is provided in the bottom wall 200, the front edge 202 of which is welded, or otherwise, secured to baffle 198 and the rear edge 204 of which is welded to the rear edge of the upper opening in air lock 42.

The top wall of the separating chamber 26 is formed by a curved baffle wall 206 having a semicylindrical front portion 208 whose lower front edge is welded to the upper edge of duct wall 196 and which extends rearwardy in a gentle downward curve to the suction fan inlet opening 36 to which it is secured. A pair of vertical sidewalls 210, 212 spaced apart the width of the chassis extend rearwardly from inlet ducts 164 to the front flat wall 214 of the suction fan 34. The above described walls and baffles are secured to each other along their meeting lines and to the inlet duct 164, air lock 42 and suction fan by welding, or otherwise, to form an airtight separation chamber 26 open only to the inlet duct, air lock and fan.

Within the separation chamber are placed a pair of flat baffle plates 216, 218 diverging rearwardly from a pivot axle 220 to which their front edges are pivotally supported for independent adjustment. The pivot axle extends from side-to-side of the separation chamber and through bearing openings in the sidewalls 210, 212. A pair of arms 222 are independently connected to the baffles 216, 218 as by means of sleeves, or the like, at the ends of axle 220, each arm having an opening at its free end. The arms serve to permit adjustment of the angle within the separation chamber taken by the two baffle plates so as to vary certain gaps, to be explained, and when this adjustment is selected, to lock the baffles independently in adjusted positions by means of pins, or the like, not shown, entered into said arm openings and into aligned openings of a series of spaced openings 224 in the crescent-shaped locking plates 226 affixed to the outer surfaces of the sidewalls of the separation chamber.

A fixed baffle 228 is secured within the separation chamber at 230 extending upwardly and entirely thereacross between the air lock 42 and the suction fan inlet 36. Baffle 228 is adapted to provide a small gap 232 between itself and the upper baffle 216. Another gap 234 is formed between the rear edge of the baffle 218 and the bottom baffle 198. A third gap 236 is provided between the baffle 218 at its pivot axle 220 and the joined edges 238 of the curved duct walls 196, 208.

The suction fan 34 is of the cyclone-type, having a cylindrical wall 240 and a rear, flat round wall 242 similar to the front wall 214. Within the casing thus formed are a plurality of propeller blades 244 secured to input shaft 90 on a reduced portion thereof by means of nut 246.

To best describe the mode of operation of the separating chamber, reference is made to FIG. 3 in which it should be noted first that pecans are picked up from the ground by the telescoping suction nozzle 32, and affixed shoe, or boot 180, whose internal cross-sectional area is reduced at the bottom next to the rollers 176, 178 and increased toward the top where the boot communicates with the vertical inlet duct 164 of the separation chamber. Since the nozzle has a cross-sectional entrance area smaller than any of the remaining cross-sections within the separation chamber, a constant suction exercised by the fan will result in the greatest velocity of incoming air at the bottom, or mouth, of the nozzle. This enables the pecans, or nuts, to be picked up from the ground by the high veloctiy of the entering air.

Along with pecans, the stream of air lifts a certain amounts of leaves, twigs, pebbles, clods or earth, and the like, herein referred to as trash, and the stream continues into the vertical duct portion 164 of the separation chamber at slightly reduced velocity, carrying the pecans and the trash.

The vertical duct increases slightly in cross-section and reduces the velocity of the stream at the portions bounded by the curved walls 196, 198. These walls serve to turn the stream of air with the nuts and trash from the vertical direction to a horizontal direction as indicated by the arrows A. Just after this turning has been accomplished the stream of air will strike baffle 218 causing a large portion of the stream to turn through an angle greater than 90°, and in a preferred embodiment as shown, follow arrows B through a turn of approximately 155°, to pass upwardly and reversely through the gap 236. This gap being of smaller cross-section than the portion of the chamber immediately below the gap imparts an increased velocity to the diverted portion of the stream which serves to take with the diverted portion most of the trash because it is lighter than the pecans. The pecans continue in their original direction along arrows C because of their weight and momentum, and gravity causes most of the nuts to drop to the lower curved baffle 198 and thence, roll slowly into the air lock 42. The portion of the stream carrying the nuts to the air lock is not completety discharged from the separation chamber by the rotation of the blades 44 in the air lock. Accordingly, a considerable part of this stream carrying some nuts and a little trash strikes the fixed baffle 228 and turns upwardly along arrows D, another part escaping with increased velocity through the small gap 232 (arrows E), and the remainder continuing in a clockwise direction along arrows F to rotate between the baffles 216, 218 and 228. Thus, a rotating swirling motion is imparted which lifts any remaining trash away from the nuts and away from the air lock to ultimately discharge such trash through the gap 232 into the inlet of the fan.

The original diverted portion of the stream carrying the initially separated trash through gap 236 is again reversed following arrows G, but turned in the opposite sense through an equal angle, shown as being about 155°, by the curved duct wall 208 forming the upper forward end portion of the separating chamber. This diverted portion is then directed horizontally and somewhat downwardly along arrows H by the upper wall 206 of the chamber and passes between said upper wall and the substantially horizontal baffle 216 rearwardly into the exhaust fan. The rapid rotation of the fan blades 244 serves to mulch the leaves in the trash and discharge them to the side of the vehicle through the outlet 40, FIG. 1, as a thin layer on the ground, serving also to protect and fertilize the ground.

The cleaned nuts deposited in the air lock are uniformly discharged therefrom by the rotation of the blades 44, being directed by baffles 124, 122 into the conveyor chute 110 along which they are carried by the belt conveyor 126 and plates 127, as previously explained, for discharge at the upper rear portion of the vehicle into a trailer.

As described, the two baffles 216, 218 are fixed to each other on the pivot axle 220 which may be turned to regulate the size of the gap 232 and to a lesser extent, the size of the passage to gap 236 and between the passage baffles 216 and 206. By this adjustment the amounts of air diverted from the original inlet duct stream and their velocities may be regulated. The total volume of air per unit of time forming the stream carrying the nuts through the separation chamber remains constant and is a function of the size and speed of the suction fan, but the proportions of this total volume passing through each of the various gaps is adjusted by regulation of the baffles to achieve the desired separation of trash and pecans and to accommodate differences arising out of varying weather conditions and different ground conditions.

It will be noted that due to the enlarged cross-section at the top of the vertical duct portion 164 both the momentum and the velocity of the pecans carried by the streams are reduced, and the momentum is further reduced when the pecans have completed their turn toward the back of the separation chamber so that before the pecans strike the inclined baffle 218, many of them, following a falling projectory due to their weight, will pass the baffle without striking the same. With the correct reduction in momentum and velocity the pecans are gently deposited on the top of the bottom baffle wall 198 of the separation chamber. They still have sufficient momentum that, aided by the air velocity, they will slip and slide along this wall until they reach the air lock. Here, most of the pecans go directly into the air lock and out of the airstream. However, a final separating action takes place as described for some of the pecans which circulate above the air lock. The increased velocity due to the smaller area of gap 236 ensures that most of the trash is here separated from the pecans and carried with the diverted portion of the stream through the upper portion of the separation chamber above the baffle 216. Any trash not thus separated is separated by the circulating stream above the air lock and passes through the gap 232 to the suction fan.

It will be apparent from the above description of the mode of operation that one may easily operate the described machine to roll slowly over the ground on which the pecans are lying. The motion of the vehicle may be controlled by the operator from his seat 24, and the suction action and movement of the cleaned pecans by the conveyor to the trailer carried behind are automatic and require no attention. The suction nozzle may have any desired width, but one provided with a 52-inch width will harvest a like dimensioned swath and will cover one acre per hour. Thus, for an orchard yield of 1,000 pounds of pecans per acre, this would allow harvesting of 1,000 pounds per hour.

The leafy portion of the trash discharged from the suction fan outlet 4 is in pulverized condition and neither this nor the remainder of the trash requires handling, as all of the trash is deposited back on the orchard soil mostly with a consistency of sawdust, making a fine organic mulch.

It should be further apparent that the special construction and shaping of the separation chamber together with the described arrangement of the baffles provide an unusually fine separation of the pecans from the trash, relying upon the opposition of the momentum of the pecans to a change in direction and velocity of the airstream in which they are carried. Thus, with a minimum of structure an unusually efficient separation of trash is accomplished. Thus, by use of the principle of momentum, trash is separated and carried away from nuts by an air velocity which would otherwise carry nuts with it. A greater degree of separation is obtained because momentum in light material (trash) is less than in nuts.

Because conventional nut harvesters clog up and will not function properly in adverse, damp, weather more rapidly than the present machines, the baffle system of the present separating chamber is designed specifically to combat adverse harvesting conditions.

A further advantage of the machine lies in the closer lateral spacing of the front wheels 12 than the rear wheels 14 so that they are tucked inbetween the lateral boundaries of the nozzle 180 to prevent running over the pecans, particularly during turning movements.

While a preferred embodiments of the invention has been shown and described, it is obvious that many changes in structure may be made. The invention, therefore, is not intended to be restricted to the exact showing of the drawings and description thereof, but is considered to include reasonable and obvious equivalents.

What is claimed is:

1. A nut harvesting machine, comprising a chassis, a nut receiving nozzle carried by the chassis, a trash separating chamber communicating near one end with said nozzle, suction means communicating with the opposite end of said separator chamber, a trash discharge outlet on said suction means, and an air lock connected to said separating chamber for receiving and discharging cleaned nuts therefrom, said separating chamber including means for moving a stream of air containing nuts and trash approximately vertically, means for turning said stream to move toward the horizontal, baffle means for reversing a portion of said stream to flow oppositely and upwardly to carry the trash and separate the trash from the nuts, and duct means for again reversing said portion of the stream carrying trash to flow toward said suction means.

2. A nut harvesting machine according to claim 1, wherein said baffle means for reversing a portion of the stream is constructed and arranged to reduce the passage area and increase the velocity of said portion of the stream carrying trash.

3. A nut harvesting machine according to claim 1, wherein said baffle means includes a first baffle positioned to direct a portion of said stream through an angle greater than 90°, said duct means for reversing the diverted portion of the stream including a second baffle disposed substantially horizontally and dividing the separating chamber into upper and lower compartments.

4. A nut harvesting machine according to claim 1, wherein said baffle means includes a first baffle disposed in said separating chamber so as to divert said trash bearing portion of said stream through an angle of approximately 155°, said duct means for again reversing said portion of the stream comprising an end wall portion of said separating chamber curved to reverse the flow through an angle of approximately 155° in the opposite sense to said first angle.

5. A harvesting machine according to claim 3, wherein said first and second baffles are fixed to a pivot axle to turn independently for adjusting the angles of said baffles with respect to the upper and lower walls of said separating chamber.

6. The harvesting machine according to claim 3, wherein a third baffle is positioned in said separating chamber to extend upwardly from the bottom of the chamber between said air lock and suction means, said third baffle cooperating with said first and second baffles to cause an upwardly circulating, reversed flow of another portion of said stream above the air lock thereby enabling final separation of remaining trash from those nuts which are not initially carried directly into the air lock.

7. The harvesting machine of claim 6, wherein said second and third baffles cooperate to provide an adjustable gap between them for venting to said suction fan to permit discharge of trash from said another portion of the stream to the suction fan.

8. A nut harvesting machine according to claim 7, wherein a pivot axle is fixed to one edge of said first and second baffles, the opposite edges of said first and second baffles being spaced respectively at different levels above the bottom of the chamber ahead of the air lock and above the third baffle, whereby adjustment of the first and second baffles will modify said spacings, the first spacing defining an entrance to a compartment defined by the air lock and said three baffles for reversed circulation of flow of said another portion of the stream and the space between the second and third baffles providing an outlet gap for trash separated in said compartment.

9. A nut harvesting machine according to claim 3, wherein said chassis carries propulsion means, said nut receiving nozzle being telescopically mounted in an inlet duct for said separating chamber and being downwardly directed toward the ground at the forward end of said separating chamber, said nozzle extending transversely of the chassis for its full width and having front and rear transverse rollers at its bottom just above ground surface, swivel means for telescopically supporting said nozzle to float with ground irregularities, and means for driving said rollers.

10. A nut harvesting machine according to claim 9, wherein said discharge outlet of the suction fan is at one side of the chassis, said air lock discharging clean nuts to a continuous moving conveyor having a first horizontal portion extending transversely under the chassis, a second portion inclined upwardly along one side of the chassis to an elevated position at the rear thereof, a third and horizontal portion extending transversely across the chassis to the other side, a fourth portion inclined forwardly and downwardly to said first horizontal portion under the air lock, the third horizontal portion of the conveyor at the upper rear of the chassis having a discharge chute for unloading clean nuts into a trailer vehicle.

References Cited

UNITED STATES PATENTS

| | | | |
|---|---|---|---|
| 2,807,128 | 9/1957 | Helfrich | 56—328 |
| 2,978,859 | 4/1961 | Tubbs | 56—328 |

ROBERT PESHOCK, Primary Examiner